(12) United States Patent
Xu et al.

(10) Patent No.: US 11,318,544 B2
(45) Date of Patent: May 3, 2022

(54) DOUBLE-SIDED DRILLING FIXTURE FOR DIE-FORGED PISTONS AND DOUBLE-SIDED DRILLING PROCESS THEREOF

(71) Applicant: Chongqing Vocational Institute of Engineering, Chongqing (CN)

(72) Inventors: Hao Xu, Chongqing (CN); Jiang Liu, Chongqing (CN); Yifei Xu, Chongqing (CN)

(73) Assignee: Chongqing Vocational Institute of Engineering, Chongqing (CN)

( * ) Notice: Subject to any disclaimer, the term of this patent is extended or adjusted under 35 U.S.C. 154(b) by 10 days.

(21) Appl. No.: 16/926,785

(22) Filed: Jul. 13, 2020

(65) Prior Publication Data
US 2021/0008645 A1 Jan. 14, 2021

(30) Foreign Application Priority Data
Jul. 11, 2019 (CN) .......................... 201910623611.4

(51) Int. Cl.
*B23B 39/22* (2006.01)
*B23B 41/12* (2006.01)
*B23B 31/16* (2006.01)

(52) U.S. Cl.
CPC ........ *B23B 39/22* (2013.01); *B23B 31/16287* (2013.01); *B23B 31/16291* (2013.01); *B23B 41/12* (2013.01); *B23B 2215/245* (2013.01); *Y10T 279/1291* (2015.01); *Y10T 279/29* (2015.01)

(58) Field of Classification Search
CPC ........ B23B 31/16287; B23B 31/16291; B23B 39/22; B23B 41/12; B23B 2215/245; Y10T 279/1291; Y10T 279/29
See application file for complete search history.

(56) References Cited

U.S. PATENT DOCUMENTS

| | | | | | |
|---|---|---|---|---|---|
| 2,031,173 | A | * | 2/1936 | Miller | B23B 39/22 408/40 |
| 2,390,420 | A | * | 12/1945 | Burke | B23B 39/22 408/41 |
| 2,660,440 | A | * | 11/1953 | Kurtz | B23B 31/16287 279/132 |

(Continued)

*Primary Examiner* — Eric A. Gates

(57) ABSTRACT

The invention relates to a double-sided drilling fixture for die-forged pistons and a double-sided drilling process thereof. It overcomes the defects of low efficiency and accuracy of the double-sided drilling operation for die-forged pistons in the prior art. The invention comprises a die-forged piston, a fixture base assembly, an upper load-resisting assembly and a lower expansion-resisting assembly. The upper load-resisting assembly is installed on the fixture base assembly and disposed above the die-forged piston. A fixation base, whose upper surface shape is the same as internal surface shape of the die-forged piston, is installed above the fixture base assembly. The die-forged piston is sleeved on the fixation base. The invention achieves simultaneous drilling on both sides of the two rear skirt surfaces of die-forged pistons and delivers quick clamping and automatic fixation, significantly reducing the difficulty in the assembly of drilling plate and workpiece and increasing the alignment accuracy.

7 Claims, 2 Drawing Sheets

(56) References Cited

U.S. PATENT DOCUMENTS

| | | | | |
|---|---|---|---|---|
| 3,076,662 A | * | 2/1963 | Kostyrka | B23B 31/16291 |
| | | | | 279/4.11 |
| 6,036,197 A | * | 3/2000 | Barbieux | B23B 31/18 |
| | | | | 279/106 |
| 11,154,939 B2 | * | 10/2021 | Murakami | B23B 41/06 |

* cited by examiner

DOUBLE-SIDED DRILLING FIXTURE FOR DIE-FORGED PISTONS AND DOUBLE-SIDED DRILLING PROCESS THEREOF

CROSS REFERENCE TO RELATED APPLICATIONS

The present application claims the benefit of Chinese Patent Application No. 201910623611.4 filed on Jul. 11, 2019, the contents of which are incorporated herein by reference in their entirety.

FIELD OF THE INVENTION

The invention relates the technical field of mechanical drilling, in particular to a double-sided drilling fixture for die-forged pistons and a double-sided drilling process thereof.

BACKGROUND OF THE INVENTION

Due to the need of die-forged piston and piston pin assembly, technically through holes should be drilled on both sides of the two rear skirt surfaces of die-forged pistons. Existing drilling devices only provides drilling for die-forged pistons on one direction (side), so workpieces are usually processed in two times.

This means two times of clamping and fixation, resulting in low efficiency. Moreover, repeated fixations are likely to cause multiple quality problems such as big workpiece fixation error and size deviation. In addition, due to its complex and irregular geometrical shape, the internal cavity of die-forged pistons needs to be fixed with a clamping plate during drilling. The accuracy of assembly between the clamping plates and workpieces cannot be controlled easily, making it difficult to meet the requirements of high-quality, high-accuracy and mass production.

Therefore, how to develop a double-sided drilling fixture for die-forged pistons has become an urgent technical problem.

SUMMARY OF THE INVENTION

The invention is to solve the defects of low efficiency and low accuracy of the double-sided drilling operation for die-forged pistons in the prior art by providing a double-sided drilling fixture for die-forged pistons and a double-sided drilling process thereof.

To achieve the above purpose, the following technical scheme is applied in the invention:

A double-sided drilling fixture for die-forged pistons, comprising a die-forged piston, a fixture base assembly, an upper load-resisting assembly and a lower expansion-resisting assembly; the upper load-resisting assembly is installed on the fixture base assembly and disposed above the die-forged piston; a fixation base is installed above the fixture base assembly.

The fixation base has an upper surface shape same as internal surface shape of the die-forged piston, and the die-forged piston is sleeved on the fixation base;

The lower expansion-resisting assembly comprises a lower hydraulic cylinder installed on the fixture base assembly with a lower piston rod facing the die-forged piston, the fixation base is provided with an expansion block, a front expansion pin and a rear expansion pin therein, the front expansion pin and the rear expansion pin are located on a same transverse section of the fixation base, and forms sliding engagement with the fixation base, the expansion block is installed at longitudinal center of the fixation base and forms sliding engagement with the fixation base, the expansion block comprises a front end being a cone frustum shape and a rear end installed on the lower piston rod, the rear ends of the front expansion pin and the rear expansion pin are pressed against narrowest part of the cone frustum at the front end of the expansion block, when the lower piston rod moves to whose maximum load range, the front end of the expansion block moves upward to squeeze the front ends of the front expansion pin and the rear expansion pin onto the die-forged piston via whose inner wall.

The double-sided drilling fixture for die-forged pistons further comprises a left pressing block assembly and a right pressing block assembly of the same structure, the left pressing block assembly comprises a left pressing head base installed on the fixture base assembly and provided with a left hydraulic cylinder installed therein, a left piston rod of the left hydraulic cylinder faces longitudinal center line of the fixture base assembly, and a left pressing head is fixedly installed on the left piston rod and, when the left piston rod moves to whose maximum load range, pressed against the outer wall of the die-forged piston.

The upper load-resisting assembly comprises a strut installed on the fixture base assembly, a pressing plate and a bush are installed on the strut with a distance fitting with each other and form rotating engagement with the strut and the bush, an upper hydraulic cylinder is installed on the pressing plate, the upper piston rod of the upper hydraulic cylinder faces the die-forged piston and is located above the die-forged piston, and an upper pressing block is installed on the upper piston rod and, when the upper piston rod moves to whose maximum load range, pressed on the die-forged piston.

The fixation base is provided with a fixation nut on top thereof.

The fixture base assembly comprises a fixture base, on which an intermediate base is fixedly installed, and a fixation disc is fixedly installed on the intermediate base.

The rear end of the expansion block is installed on the lower piston rod through a transition block and a piston rod joint.

The top of the left pressing head is a semicircle.

A double-sided drilling process of the double-sided drilling fixture for die-forged pistons, comprising the following steps:

Pre-clamping the fixation point of the upper load-resisting assembly when the die-forged piston is sleeved on the fixation base;

Confirming that the die-forged piston has been fitted with the fixation point on the fixation base without torsion;

Actuating the lower expansion-resisting assembly, so that the front expansion pin and the rear expansion pin are expanded from the fixation point on the die-forged piston via whose inner wall;

Actuating the left and right pressing block assemblies, so that the left pressing head and the right pressing head are pressed against the outer wall of the die-forged piston;

Starting a machine tool, so that two drill bits on the left and right sides quickly approach the die-forged piston at the same time and automatically turn into a slow feeding speed at 5 mm, and the drill bits begin to drill;

After completion of drilling, returning the two drill bits to original point quickly at the same time;

Returning an automatically released upper load-resisting assembly, the lower expansion-resisting assembly, the left pressing block assembly and the right pressing block assembly;

Removing the die-forged piston with drilled holes on both sides.

Beneficial Effects

The invention provides a double-sided drilling fixture for die-forged pistons and a double-sided drilling process thereof and, compared to the prior art, achieves simultaneous drilling on both sides of the two rear skirt surfaces of die-forged pistons and delivers quick clamping and automatic fixation, significantly reducing the difficulty in the assembly of drilling plate and workpiece, increasing alignment accuracy, shortening processing time and improving production efficiency.

where, 1-fixture base, 2-lower hydraulic cylinder, 3-lower piston rod, 4-intermediate base, 5-fixation disc, 6-transition block, 7-right piston rod, 8-right hydraulic cylinder, 9-right pressing head base, 10-fixation bush, 11-pin shaft, 12-right drill bit, 13-fixation base, 14-right pressing head, 15-die-forged piston, 16-upper pressing block, 17-upper piston rod, 18-upper hydraulic cylinder, 19-fixation nut, 20-left pressing head, 21-left drill bit, 22-left hydraulic cylinder, 23-left piston rod, 24-strut, 25-bush, 26-pressing plate, 27-front expansion pin, 28-expansion block, 29-hexagon socket bolt, 30-handle, 31-rear expansion pin, 32-piston rod joint, 33-left pressing head base.

DETAILED DESCRIPTION OF THE PREFERRED EMBODIMENT

Figure 1:
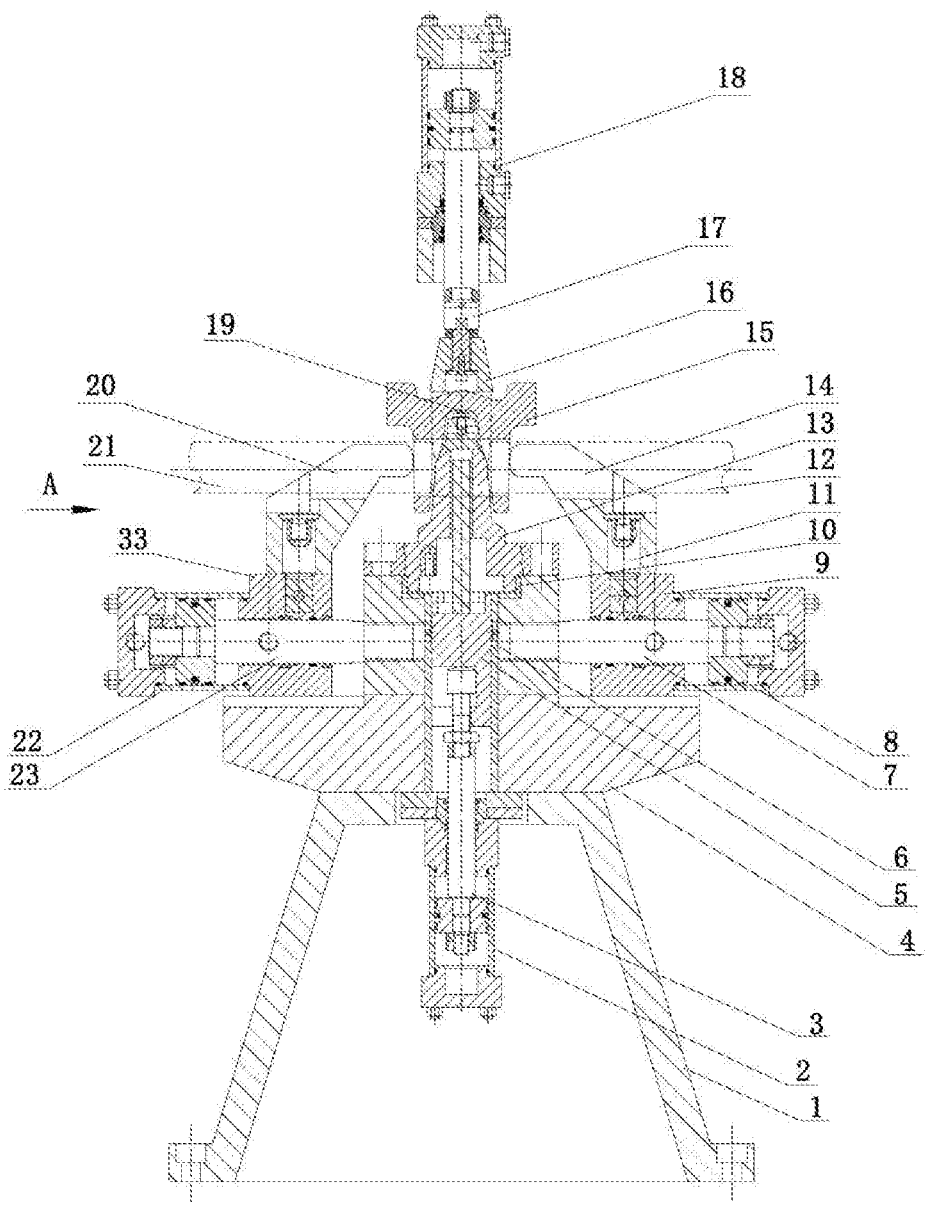
FIG. 1 is a structural diagram showing the front view of the invention.
Figure 2:
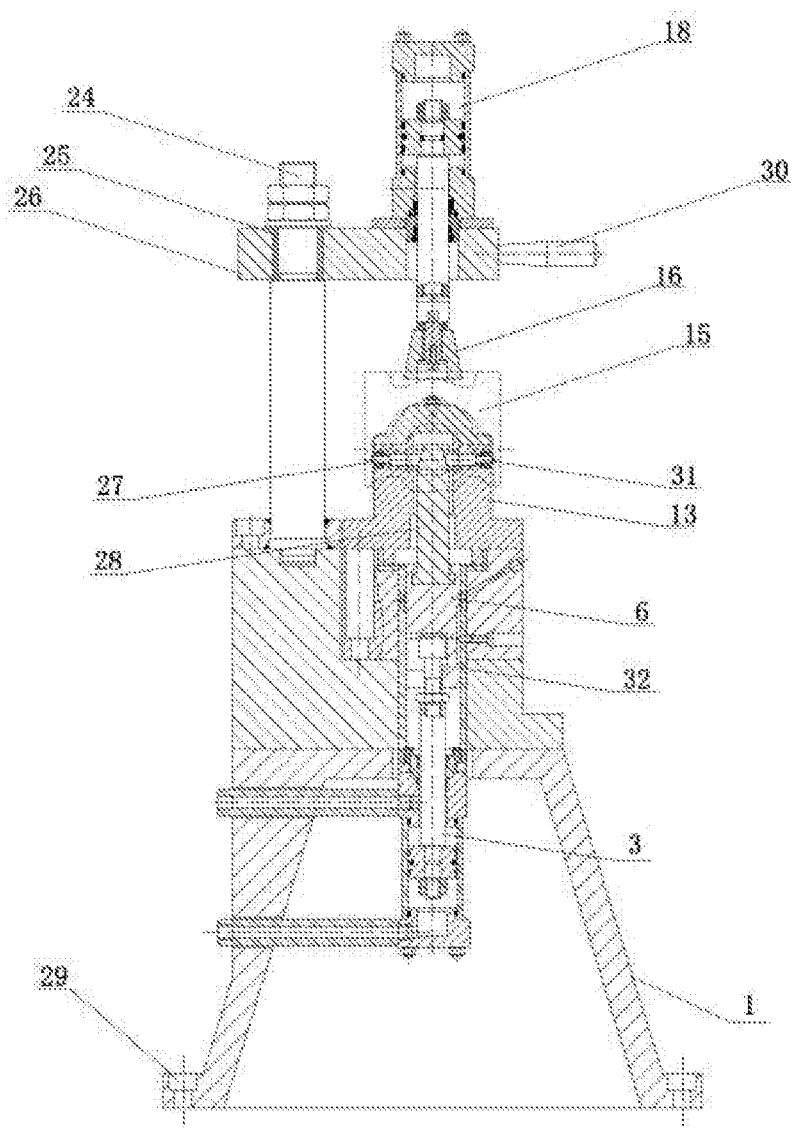
FIG. 2 shows the left view of FIG. 1.

For a further understanding of the structural characteristics of the invention and the achieved effects, the invention is described in combination with the preferred embodiments and the drawings as follows:

As shown in FIG. 1 and FIG. 2, the double-sided drilling fixture for die-forged pistons according to the invention comprises a die-forged piston 15, a fixture base assembly, a left pressing block assembly, a right pressing block assembly, an upper load-resisting assembly and a lower expansion-resisting assembly. The fixture base assembly is used as an installation platform for relevant assemblies, the upper load-resisting assembly is used for downward load-resisting fixation of the die-forged piston 15 from above, and the lower expansion-resisting assembly for outward expansion-resisting fixation of the die-forged piston 15 from below. The left and right pressing block assemblies are used for load-resisting limiting and fixation of the die-forged piston 15 on the left and right sides respectively.

As such, fixation from the above, left and right is achieved by the upper load-resisting assembly and the left and right pressing block assemblies. In addition, due to the complex and irregular shape of the internal cavity of the die-forged piston 15, the lower expansion-resisting assembly is used to push against the outer wall of the die-forged piston 15 outward from the internal cavity of the die-forged piston 15, so as to ensure the installation firmness of the die-forged piston 15 in combination with opposite forces produced by the left and right pressing block assemblies. The effects of the lower expansion-resisting assembly: 1. pushing against the outer wall of the die-forged piston 15 outward from the internal cavity of the die-forged piston 15, thus to produce a fixation force from the internal cavity of the die-forged piston 15; 2. cooperating with the upper load-resisting assembly to form upward and downward pressing forces; 3. cooperating with the left and right pressing block assemblies to form opposite forces, thus to overcome the defect of single supporting force produced through traditional lower support schemes (traditionally only a single upward force from below is produced) through the lower expansion-resisting assembly, forming forces from above, below, left and right in cooperation with each other to firmly clamp the die-forged piston 15.

In addition, considering the special shape of the internal cavity of the die-forged piston 15, the fixation base 13 is design to have an upper surface shape same as the (internal cavity) surface shape of the die-forged piston 15, and the die-forged piston 15 is sleeved on the fixation base 13. For a better match with the die-forged piston 15 of different models, a fixation nut 19 can be installed on top of the fixation base 13, and can be slightly adjusted to form a convex at the front end of the fixation base 13.

The fixture base assembly comprises a fixture base 1 that can be fixed at the bottom through a plurality of hexagon socket bolts 29. An intermediate base 4 is fixedly installed on the fixture base 1 as a supporting platform, and a fixation disc 5 is fixedly installed on the intermediate base 4 to facilitate limiting installation. Moreover, a traditional fixation bush 10 can also be installed on the fixation disc 5 to reduce error.

The lower expansion-resisting assembly comprises a lower hydraulic cylinder 2 installed on the fixture base assembly to drive the lower expansion-resisting assembly. The lower piston rod 3 of the lower hydraulic cylinder 2 faces the die-forged piston 15. The fixation base 13 is provided with an expansion block 28, a front expansion pin 27 and a rear expansion pin 31 installed therein. The expansion block 28 extends forward to form an outer top of the front expansion pin 27 and the rear expansion pin 31.

The front expansion pin 27 and the rear expansion pin 31 are located on the same transverse section of the fixation base 13, that is, the rear extension lines of the front expansion pin 27 and the rear expansion pin 31 meet each other. The front expansion pin 27 and the rear expansion pin 31 form sliding engagement with the fixation base 13. Regarding the movement of the fixation base 13 to the left and right, the sliding engagement can be achieved by traditional methods in the prior art. For example, the front expansion pin 27 or the rear expansion pin 31 passes through the side wall of the fixation base 13 and performs flexible limiting by spring. Similarly, the expansion block 28 is installed at a longitudinal center in the fixation base 13. The expansion block 28 forms sliding engagement with the fixation base 13 for upward and downward movement of the fixation base 13. The expansion block 28 can move upward and downward in the fixation base 13. The front end of the expansion block 28 is of a cone frustum shape, which is characterized by a narrow front and a wide back. The special frustum shape is used to form extension or retraction of the front expansion pin 27 and the rear expansion pin 31. The rear end of the expansion block 28 is installed on the lower piston rod 3. In practical application, in order to shorten the movement range of the expansion block 28, the rear end of the expansion block 28 can be installed on the lower piston rod 3 through the transition block 6 and the piston rod joint 32.

The upward and downward movement of the lower piston rod 3 drives the upward and downward movement of the expansion block 28. The rear ends of the front expansion pin 27 and the rear expansion pin 31 are pressed against narrowest part of the cone frustum at the front end of the expansion block 28. At the same time, when the lower piston rod 3 moves to whose maximum load range, the expansion block 28 moves up, so that the front ends of the front expansion pin 27 and the rear expansion pin 31 are pressed against the die-forged piston 15 via whose inner wall. That is, when the lower piston rod 3 moves upward, it drives the expansion block 28 to rise. Because the front end of the expansion block 28 is in the shape of a cone frustum, the rise causes an increase in the space between the front expansion pin 27 and the rear expansion pin 31. The front expansion pin 27 and the rear expansion pin 31 are extruded out of the fixation base 13 and fixed on the die-forged piston 15 via whose inner wall.

The left and right pressing block assemblies are of the same structure and cooperate with the front expansion pin 27 and the rear expansion pin 31 to fix the side wall of the die-forged piston 15. The front expansion pin 27 and the rear expansion pin 31 fix the die-forged piston 15 via the inner wall (inner cavity) hereof, and the left and right pressing block assemblies fix the die-forged piston 15 from the outer wall.

Figure 3:
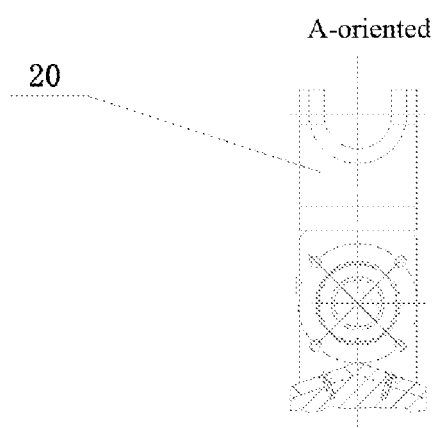
FIG. 3 shows A-oriented view of FIG. 1.

The left pressing block assembly comprises a left pressing head base 33 installed on the fixture base assembly (intermediate base 4). The left pressing head base 33 is provided with a left hydraulic cylinder 22 installed therein, whose left piston rod 23 faces a longitudinal center line of the fixture base assembly, that is, the left piston rod 23 makes transverse (left-right) movement. A left pressing head 20 is fixedly installed on the left piston rod 23, optionally by a traditional pin shaft 11. When the left piston rod 23 moves to whose maximum load range, the left pressing head 20 is pressed against the die-forged piston 15, forming limiting of the outer wall of the die-forged piston 15 on the left. Similarly, the right pressing block assembly comprises a right pressing head base 9 and a right hydraulic cylinder 8. A right piston rod 7 passes through the right hydraulic cylinder 8 and drives the right pressing head 14 to limit the outer wall of the die-forged piston 15 on the right. Due to the arc shape of the outer wall of the die-forged piston 15, slipping is likely to occur during drilling operation. As shown in FIG. 3, the top of the left pressing head 20 (right pressing head 14) is designed to be a semicircle, acting as a lead hole to guide the left drill bit 21 and the right drill bit 12.

The upper load-resisting assembly comprises a strut 24 installed on the fixture base assembly (intermediate base 4). The pressing plate 26 and a bush 25 are installed on the strut 24 with a distance fitting with each other (holes of the pressing plate and the bush) and form rotating engagement with the strut 24 and the bush 25. A handle 30 can also be installed on the pressing plate and used to easily rotate the pressing plate 26 to achieve quick clamping of the die-forged piston 15, further improving the efficiency. An upper hydraulic cylinder 18 is installed on the pressing plate 26, the upper piston rod 17 of the upper hydraulic cylinder 18 faces the die-forged piston 15 and is located above the die-forged piston 15, forming downward movement tendency. Similarly, an upper pressing block 16 is installed on the upper piston rod 17 and, when the upper piston rod 17 moves to whose maximum load range, pressed on the die-forged piston 15, forming downward pressing force from above against the die-forged piston 15.

As such, a double-sided drilling process is also provided for the double-sided drilling fixture for die-forged pistons comprising the following steps:

Step 1: Pre-clamping the fixation point of the upper load-resisting assembly when the die-forged piston 15 is sleeved on the fixation base 13. Actuating the upper hydraulic cylinder 18, so that the upper piston rod 17 drives the upper pressing block 16 to perform downward fixation.

Step 2: Confirming that the die-forged piston 15 has been fitted with the fixation point on the fixation base 13 without torsion.

Step 3: Actuating the lower expansion-resisting assembly, so that the front expansion pin 27 and the rear expansion pin 31 are expanded from the fixation point on the inner wall of the die-forged piston 15. Actuating the lower hydraulic cylinder 2 to drive the lower piston rod 3 to rise, and squeezing the front expansion pin 27 and the rear expansion pin 31 out of the fixation base 13, forming expansion at the fixation point on the internal wall of the die-forged piston 15.

Step 4: Actuating the left and right pressing block assemblies, so that the left pressing head 20 and the right pressing head 14 are pressed against the outer wall of the die-forged piston 15. Actuating the left hydraulic cylinder 22 and the right hydraulic cylinder 8 to fix the die-forged piston 15 on the left and right sides.

Step 5: Starting a machine tool, so that two drill bits (left drill bit 21 and right drill bit 12) on the left and right sides quickly approach the die-forged piston 15 at the same time and automatically turn into a slow feeding speed at 5 mm and, at the same time, the drill bits begin to drill under the guidance of the left pressing head 20 and the right pressing head 14.

Step 6: After completion of drilling, returning the two drill bits (left drill bit 21 and right drill bit 12) to original point quickly at the same time.

Step 7: Returning an automatically released upper load-resisting assembly, the lower expansion-resisting assembly, the left pressing block assembly and the right pressing block assembly.

Step 8: Removing the die-forged piston 15 with drilled holes on both sides.

The above displays and describes the basic principle, main features and advantages of the invention. A person skilled in the art should understand that the invention is not limited to the above embodiments. The above embodiment and the description in the Specification only explain the principles of the invention. Under the premise of not departing from the spirit and scope of the invention, any changes and improvements of the invention shall still fall within the protection scope of the invention. The protection scope of the invention is defined by the attached Claims and the equivalent.

What is claimed is:

1. A double-sided drilling fixture for die-forged pistons, comprising a fixture base assembly, an upper load-resisting assembly and a lower expansion-resisting assembly, wherein the upper load-resisting assembly is installed on the fixture base assembly and disposed above the a die-forged piston (15); a fixation base (13) is installed above the fixture base assembly, characterized in that:

the fixation base (13) has an upper surface shape same as internal surface shape of the die-forged piston (15); the die-forged piston (15) is sleeved on the fixation base (13); and the lower expansion-resisting assembly comprises a lower hydraulic cylinder (2) installed on the fixture base assembly with a lower piston rod (3) facing the die-forged piston (15), the fixation base (13) is provided with an expansion block (28), a front expansion pin (27) and a rear expansion pin (31) therein, the front expansion pin (27) and the rear expansion pin (31) are located on a same transverse section of the fixation base (13), and forms sliding engagement with the fixation base (13), the expansion block (28) is installed at a longitudinal center of the fixation base (13) and forms sliding engagement with the fixation base (13), the front end of the expansion block (28) is of a cone frustum shape, the rear end of the expansion block (28) is installed on the lower piston rod (3), the rear ends of the front expansion pin (27) and the rear expansion pin (31) are pressed against narrowest part of the cone frustum at the front end of the expansion block (28), wherein when the lower piston rod (3) moves to its maximum load range, the front end of the expansion block (28) moves upward to squeeze the front ends of the front expansion pin (27) and the rear expansion pin (31) onto the inner wall of the die-forged piston (15).

2. The double-sided drilling fixture for die-forged pistons according to claim 1, characterized by further comprising a left pressing block assembly and a right pressing block assembly of the same structure, the left pressing block assembly comprises a left pressing head base (33) installed on the fixture base assembly and provided with a left hydraulic cylinder (22) installed therein, a left piston rod (23) of the left hydraulic cylinder (22) faces a longitudinal center line of the fixture base assembly, and a left pressing head (20) is fixedly installed on the left piston rod (23) and, when the left piston rod (23) moves to its maximum load range, it is pressed against the outer wall of the die-forged piston (15).

3. The double-sided drilling fixture for die-forged pistons according to claim 2, characterized in that the upper load-resisting assembly comprises a strut (24) installed on the fixture base assembly, a pressing plate (26) and a bush (25) are installed on the strut (24) and form rotating engagement with the strut (24) and the bush (25), an upper hydraulic cylinder (18) is installed on the pressing plate (26), the upper piston rod (17) of the upper hydraulic cylinder (18) faces the die-forged piston (15) and is located above the die-forged piston (15), and an upper pressing block (16) is installed on the upper piston rod (17) and, when the upper piston rod (17) moves to its maximum load range, it is pressed on the die-forged piston (15).

4. The double-sided drilling fixture for die-forged pistons according to claim 1, characterized in that the fixation base (13) is provided with a fixation nut (19) on top thereof.

5. The double-sided drilling fixture for die-forged pistons according to claim 1, characterized in that the fixture base assembly comprises a fixture base (1), on which an intermediate base (4) is fixedly installed, and a fixation disc (5) is fixedly installed on the intermediate base (4).

6. The double-sided drilling fixture for die-forged pistons according to claim 1, characterized in that the rear end of the expansion block (28) is installed on the lower piston rod (3) through a transition block (6) and a piston rod joint (32).

7. The double-sided drilling fixture for die-forged pistons according to claim 1, characterized that a top of the left pressing head (20) is in the form of a semicircle.

* * * * *